US011102214B2

(12) United States Patent
Kukreja et al.

(10) Patent No.: US 11,102,214 B2
(45) Date of Patent: Aug. 24, 2021

(54) DIRECTORY ACCESS SHARING ACROSS WEB SERVICES ACCOUNTS

(71) Applicant: Amazon Technologies, Inc., Seattle, WA (US)

(72) Inventors: Dinesh Ramesh Kukreja, Seattle, WA (US); Keith Littleton Croney, Seattle, WA (US); Peter Lopes Pereira, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 16/146,892

(22) Filed: Sep. 28, 2018

(65) Prior Publication Data

US 2020/0067933 A1 Feb. 27, 2020

Related U.S. Application Data

(60) Provisional application No. 62/723,386, filed on Aug. 27, 2018.

(51) Int. Cl.
*H04L 29/06* (2006.01)

(52) U.S. Cl.
CPC ........ *H04L 63/105* (2013.01); *H04L 63/0272* (2013.01); *H04L 63/101* (2013.01)

(58) Field of Classification Search
CPC .. H04L 63/101; H04L 63/105; H04L 63/0272
(Continued)

(56) References Cited

U.S. PATENT DOCUMENTS 9,276,812 B1 * 3/2016 Nagargadde ........ H04L 41/5054
9,928,107 B1 * 3/2018 Vincent ................ G06F 9/4856
(Continued)

FOREIGN PATENT DOCUMENTS

WO 2015070246 A2 5/2015
WO 2018005829 A1 1/2018
WO WO-2018005829 A1 * 1/2018 ............... G06F 8/60

OTHER PUBLICATIONS

"AWS Lambda: Developer Guide", Jun. 26, 2016 (Jun. 26, 2016), XP055402554, (Year: 2016).*
(Continued)

*Primary Examiner* — Luu T Pham
*Assistant Examiner* — Walter J Malinowski
(74) *Attorney, Agent, or Firm* — Lowenstein Sandler LLP

(57) ABSTRACT

A method includes determining to share access to a directory between a first web services account and a second web services account that lacks access to the directory, wherein the directory is managed by a directory service that executes within a first on-demand configurable pool of shared computing resources, and wherein the second web services account is associated with a second on-demand configurable pool of shared computing resources. The method includes generating a virtual directory for the second web services account, wherein the virtual directory comprises one or more virtual resources that are representations of resources on the directory, and wherein the virtual directory further comprises a reference to the directory. The method further includes receiving an access request to the directory from the second web services account, wherein the access request is received via the reference from the virtual directory to the directory, and then granting the access request.

18 Claims, 9 Drawing Sheets

(58) Field of Classification Search
USPC ............................................................ 726/4
See application file for complete search history.

(56) References Cited

U.S. PATENT DOCUMENTS

| | | | | |
|---|---|---|---|---|
| 10,484,334 | B1 * | 11/2019 | Lee | H04L 63/0245 |
| 2001/0051955 | A1 * | 12/2001 | Wong | G06F 11/2071 |
| 2002/0092004 | A1 * | 7/2002 | Lee | G06F 8/00 717/140 |
| 2004/0098615 | A1 | 5/2004 | Mowers et al. | |
| 2006/0041436 | A1 * | 2/2006 | Brodie | G06Q 10/10 726/4 |
| 2009/0064284 | A1 * | 3/2009 | Poston | G06F 21/10 726/4 |
| 2009/0254587 | A1 * | 10/2009 | Shlomai | G06Q 10/10 |
| 2009/0307135 | A1 * | 12/2009 | Gupta | G06Q 30/0601 705/44 |
| 2009/0328178 | A1 * | 12/2009 | McDaniel | H04L 63/0884 726/9 |
| 2013/0238816 | A1 * | 9/2013 | Skog | H04L 12/4625 709/245 |
| 2014/0075501 | A1 | 3/2014 | Srinivasan et al. | |
| 2014/0181992 | A1 * | 6/2014 | Janson | G06F 21/60 726/27 |
| 2014/0230044 | A1 * | 8/2014 | Liu | H04L 12/4633 726/15 |
| 2014/0245423 | A1 * | 8/2014 | Lee | H04L 63/0218 726/12 |
| 2014/0280595 | A1 * | 9/2014 | Mani | H04L 67/10 709/204 |
| 2014/0334495 | A1 | 11/2014 | Stubberfield et al. | |
| 2015/0007269 | A1 * | 1/2015 | Brugger | H04L 63/0884 726/4 |
| 2015/0052525 | A1 * | 2/2015 | Raghu | H04L 67/10 718/1 |
| 2015/0161161 | A1 * | 6/2015 | Iwanaga | G06F 16/13 707/634 |
| 2016/0094584 | A1 | 3/2016 | Mehta et al. | |
| 2016/0117231 | A1 * | 4/2016 | Lee | H04L 41/0668 714/4.11 |
| 2017/0041296 | A1 * | 2/2017 | Ford | H04L 63/0421 |
| 2017/0118247 | A1 * | 4/2017 | Hussain | G06F 21/62 |
| 2017/0163564 | A1 * | 6/2017 | Pogrebinsky | G06F 9/5072 |
| 2017/0192997 | A1 * | 7/2017 | Sergeev | G06F 3/064 |
| 2017/0251257 | A1 * | 8/2017 | OBrien | H04L 67/306 |
| 2017/0264659 | A1 * | 9/2017 | Raju | G06F 9/5044 |
| 2017/0293431 | A1 * | 10/2017 | Dor | G06F 3/0644 |
| 2017/0330159 | A1 * | 11/2017 | Castinado | G06Q 20/02 |
| 2017/0359238 | A1 * | 12/2017 | Hughes | H04L 43/067 |
| 2018/0007002 | A1 * | 1/2018 | Landgraf | H04L 63/0263 |
| 2018/0026877 | A1 * | 1/2018 | Mysyk | H04L 45/04 709/206 |
| 2018/0062923 | A1 * | 3/2018 | Katrekar | H04L 63/10 |
| 2018/0159897 | A1 * | 6/2018 | Kakumaru | H04L 63/1425 |
| 2018/0189311 | A1 * | 7/2018 | Newhouse | G06F 16/1734 |
| 2018/0228273 | A1 * | 8/2018 | Kovac | A45C 15/00 |
| 2018/0302243 | A1 * | 10/2018 | Li | G06F 9/455 |
| 2019/0095230 | A1 * | 3/2019 | Glessner | G06F 21/57 |
| 2019/0109777 | A1 * | 4/2019 | Mircescu | H04L 67/104 |
| 2019/0109885 | A1 * | 4/2019 | Kurian | H04L 67/12 |
| 2019/0180363 | A1 * | 6/2019 | Fabris | G06Q 20/14 |
| 2019/0205410 | A1 * | 7/2019 | Goldberg | G06F 16/24552 |
| 2020/0059492 | A1 * | 2/2020 | Janakiraman | H04L 63/0263 |

OTHER PUBLICATIONS

Palomares, Daniel, Daniel Migault, Hendrik Hendrik, Maryline Laurent, and Guy Pujolle. "Elastic virtual private cloud." In Proceedings of the 10th ACM symposium on QoS and security for wireless and mobile networks, pp. 127-131. 2014. (Year: 2014).*

Duan, Jun, and Yuanyuan Yang. "A data center virtualization framework towards load balancing and multi-tenancy." In 2016 IEEE 17th International Conference on High Performance Switching and Routing (HPSR), pp. 14-21. IEEE, 2016. (Year: 2016).*

Lallali, Saliha, Nicolas Anciaux, Iulian Sandu Popa, and Philippe Pucheral. "A secure search engine for the personal cloud." In Proceedings of the 2015 ACM SIGMOD International Conference on Management of Data, pp. 1445-1450. 2015. (Year: 2015).*

Hu, Bo, Liang-Jie Zhang, Dong Liu, Yi-Feng Xie, and Li-hui Luo. "A cloud oriented account service mechanism for SME SaaS ecosystem." In 2012 IEEE Ninth International Conference on Services Computing, pp. 336-343. IEEE, 2012. (Year: 2012).*

International Search Report and Written Opinion dated Nov. 7, 2019, for International Application No. PCT/US2019/047173.

Slawik, M. et al. "Cyclone" The Multi-Cloud Middleware Stack for Application Deployment and Management, 2017 IEEE International Conference on Cloud Computing technology and Science (Cloudcom), IEEE, Dec. 11, 2017, pp. 347-352.

Anonymous, "How Security Principals Work", Mar. 28, 2003, retrieved from https://technet.microsoft.com/en-us/library/cc779144(v=ws.10).aspx on Sep. 13, 2017, 42 pages.

* cited by examiner

| ATTRIBUTE NAME | TYPE |
|---|---|
| ConsumerAccountId_AirportCode(HashKey) | String |
| ConnectionId(RangeKey) | String |
| OwnerAccountId_AirportCode | String |
| OwnerAccountId | String |
| OwnerExternalDomainId | String |
| ConsumerAccountId | String |
| ConsumerExternalDomainId | String |
| StatusCreationDate | String |
| LastUpdateDate | String |
| Payload | String<br>{<br>RequestedBy: <accountId><br>} |

FIG. 6

| ATTRIBUTE NAME | TYPE |
|---|---|
| CustomertId(HashKey) | String |
| ExternalDomainId(RangeKey) | String |
| ConnectionId | String |
| CreationDate | String |
| LastUpdateDate | String |
| Payload | String<br>{<br>applications : List<Application><br>}<br>Application<br>{<br>applicationId: String,<br>applicationName: String,<br>applicationStatus: String,<br>requestedBy: String,<br>lastUpdateDate: String,<br>creationDate: String<br>} |

FIG. 7

DIRECTORY ACCESS SHARING ACROSS WEB SERVICES ACCOUNTS

RELATED APPLICATIONS

This patent application claims the benefit under 35 U.S.C. § 119(e) of U.S. Provisional Application No. 62/723,386, filed Aug. 27, 2018, which is incorporated by reference herein.

BACKGROUND

Cloud-based directory services (e.g., such as Amazon Web Services (AWS) Directory Service for Microsoft Active Directory (AWS Managed Microsoft AD, also referred to simply as AWS Directory Service) and Microsoft's Azure Active Directory (Azure AD)) enable customers to move their directory service implementations (e.g., instances of a directory service such as Microsoft Active Directory (AD)) from existing datacenters into a cloud environment. Customers of such cloud-based directory services are increasingly migrating their workloads to the cloud while still preserving their on-premises credentials (e.g., on-premises Active Directory (AD) credentials) with their workloads. Frequently, such customers have adopted a multi-account model where each business unit has its own web services account (e.g., their own AWS account).

Existing cloud-based directory services are available in a single web services account and cannot be shared between web services accounts. Customers who want to use on-premises user credentials generally need to create a trust (e.g., an AD trust) between an instance of the cloud-based directory service (e.g., an AWS Managed AD) and their on-premises AD forest. For multiple accounts, these customers set up a separate instance of the cloud-based directory service (e.g., a separate directory) in each web services account. This increases the configuration effort and cost to set up the cloud-based directory service and to support applications on a directory in an instance of the cloud-based directory service. Additionally, customers also would have to perform potentially thousands of configurations to set up hundreds of trusts.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 6 illustrates a sample table schema for records indicating sharing of directory access between web services accounts.

FIG. 7 illustrates a sample table schema for records indicating application permissions to shared directories.

DETAILED DESCRIPTION

Figure 1A:
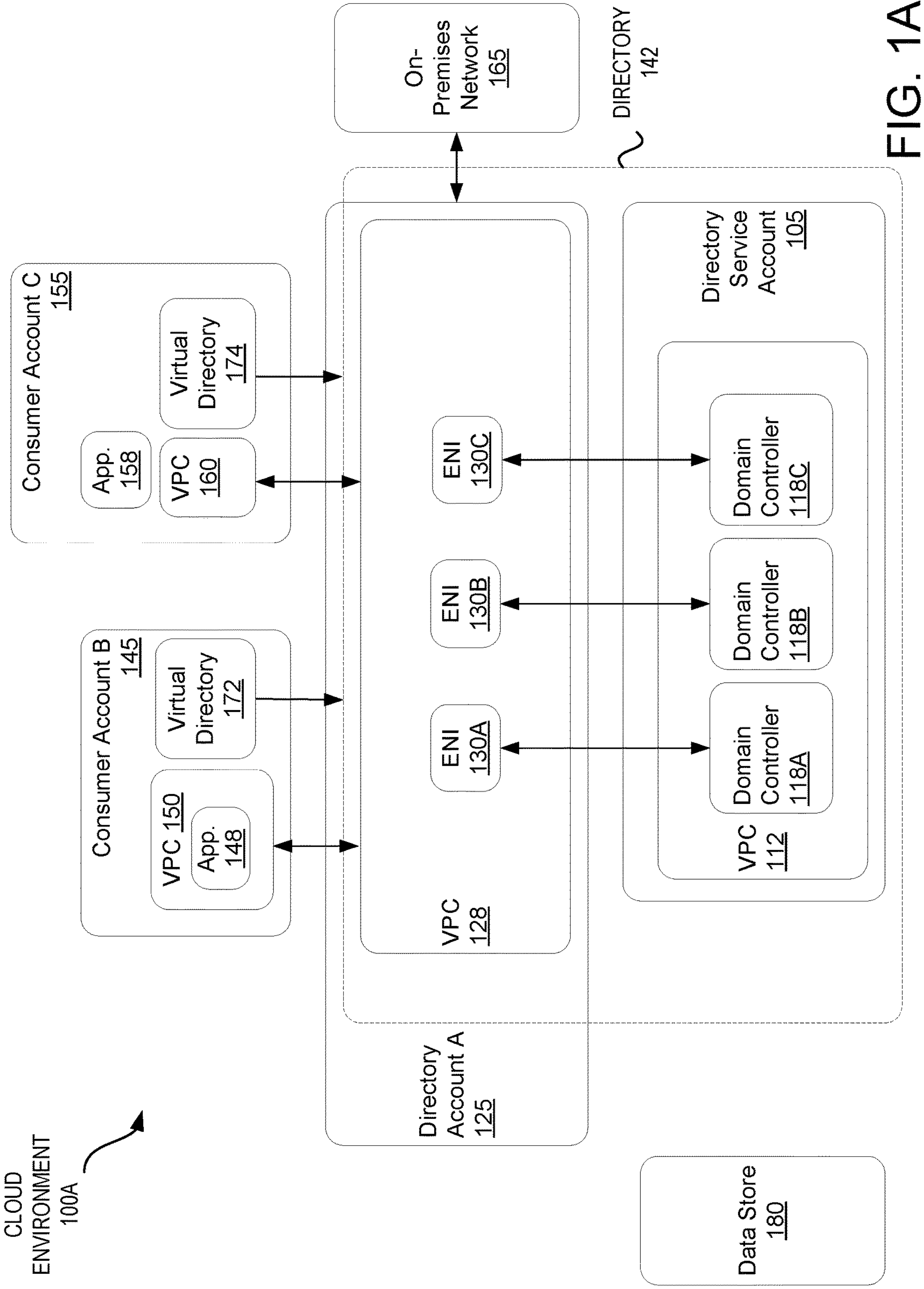
FIG. 1A illustrates an example cloud environment including a distributed architecture of connected virtual private clouds (VPCs) that share a directory, according to embodiments of the present disclosure.

Embodiments of the present disclosure relate to a mechanism to share directory access (e.g., access to a directory managed by a Microsoft AD instance) between web services accounts (e.g., between a directory account and one or more consumer accounts). Cloud based directory services such as AWS Managed Microsoft AD and Azure AD enable administrators to set up and run a directory service (e.g., Microsoft AD) in the cloud and/or connect cloud-based resources (e.g., software as a service (SaaS) services) to existing on-premises directory service deployments (e.g., on-premises instances of Microsoft AD). This enables administrators to implement cloud-based directory services to manage users and groups, use SaaS business productivity solutions (e.g., such as Amazon Relational Database Service (RDS), Amazon Workspaces, Amazon Quicksight), join virtual computing environments (e.g., Amazon Elastic Compute Cloud (EC2) instances), simplify management of cloud-based Linux and Microsoft Windows workloads, and so on. However, existing cloud-based directory services are available in a single web services account and cannot be shared between web services accounts. The sharing of access to directories between web services accounts is non-trivial, and has heretofore not been achieved by cloud computing environments.

By enabling the sharing of directories between web services accounts (e.g., between AWS accounts), embodiments permit administrators to create a single directory service instance (e.g., a single AWS Managed Microsoft AD instance) that will be available to some or all web services accounts of an enterprise. This significantly reduces the amount of compute resources, memory resources and monetary resources that are expended to maintain a directory for an enterprise while still enabling the enterprise to maintain distinct web services accounts for different uses, users and/or applications. Accordingly, in embodiments enterprises are able to adopt a multi-account model in which each business unit has its own web services account, and each of those web services accounts is able to use the same directory managed by a single Microsoft AD instance (e.g., a single directory controller or set of directory controllers) while maintaining isolated application data. Embodiments therefore enable applications associated with different web services accounts in the cloud to be isolated from one another but still access the same directory. For example, a first application in a first consumer account may have a first list of users and a second application in a second consumer account may have a second list of users, and both the first application and the second application may share the same underlying directory. This enables application level data to be isolated while sharing a directory. Additionally, embodiments further enable a single directory to be shared across regions, resulting in a single global directory.

In some embodiments, processing logic executing in a cloud environment receives a sharing request to share access of a directory to a second web services account that lacks access to the directory, wherein a first web services account has access to the directory and administrative privileges to the directory. Processing logic makes a determination to share access of the directory to the second web services account, wherein the directory is managed by a domain controller that runs within a first VPC and the second web services account is associated with a second VPC. Processing logic stores an access permission record for the access to the directory by the second web services account in a data store. Processing logic generates a virtual directory for the second web services account, wherein the virtual directory comprises one or more virtual resources that are representations of resources on the directory, and wherein the virtual directory further comprises a reference to the directory. The virtual directory provides access to the directory in the first VPC for applications associated with the second web services account and running in the second VPC. Processing logic receives an access request to the directory from the second web services account (and from the second VPC), wherein the access request is received via the reference from the virtual directory to the directory. Processing logic determines that the second web services account has permission to access the directory and grants the access request.

In some embodiments, a system includes multiple distinct on-demand configurable pools of shared resources. Each on-demand configurable pool of shared resources may be isolated from other on-demand configurable pools of shared resources in the system. The system may be, for example, a cloud environment, and the on-demand configurable pools of shared resources may be VPCs within the cloud environment. In one embodiment, the system includes a first on-demand configurable pool of shared computing resources that act together to provide a directory that is managed by a directory service, a second on-demand configurable pool of shared resources associated with a first web services account that has administrative privileges to the directory, and a third on-demand configurable pool of shared resources associated with a second web services account. One or more processing devices from at least one of the first on-demand configurable pool of shared computing resources, the second on-demand configurable pool of shared resources or the third on-demand configurable pool of shared resources may operate together to perform operations that enable sharing of the directory between web services accounts and between different isolated on-demand configurable pools of shared resources (e.g., between different VPCs) associated with the different web services accounts.

In one embodiment, the one or more processing devices receive a sharing request to share the directory with the second web service account, wherein the sharing request is received from a first one of the first web services account and the second web services account. The one or more processing devices receive an acceptance of the sharing request from a second one of the first web services account and the second web services account. The one or more processing devices then generate a virtual directory for the second web services account, wherein the virtual directory comprises one or more virtual resources that are representations of resources on the directory, and wherein the virtual directory further comprises a reference to the directory. At some later point in time, the one or more processing devices may receive an access request to the directory from the second web services account, wherein the access request is received via the reference from the virtual directory to the directory, may determine that the second web services account has permission to access the directory, and may grant the access request. The described system may maintain isolation between different VPCs associated with different web services accounts (thus improving security) while also simplifying setup, reducing administration costs, reducing compute resource utilization and/or reducing memory resource utilization by enabling a directory within one VPC to be shared with applications in other VPCs.

Turning now to the figures, FIG. 1A illustrates an example cloud environment 100A including a distributed architecture of connected VPCs 112, 128, 150, 160 that share a directory 142, according to embodiments of the present disclosure. The cloud environment 100A is or includes a cloud services platform that provides on-demand delivery of compute power, database storage, applications and other information technology (IT) resources. The cloud environment 100A provides rapid access to flexible and low cost IT resources. Examples of a cloud environment 100A are Amazon AWS, Microsoft Azure Cloud, Alibaba Cloud Computing Service and Google Cloud Platform. The cloud environment 100A may include one or more Infrastructure as a Service (IaaS), Platform as a Service (PaaS) and or SaaS offerings. IaaS provides virtual servers and storage in an on-demand basis. PaaS includes a set of tools and services that facilitate building an application while abstracting out the details of the servers that the applications run on. SaaS includes application software running in the cloud environment 100A that can be utilized on demand.

Customers (e.g., administrators of enterprises) may access the cloud environment 100A via one or more web services accounts, such as directory account A 125, consumer account B 145, and consumer account C 155. Each web services account 125, 145, 155 may have its own users, its own security configuration, and so on. Additionally, each web services account 125, 145, 155 may be associated with its own VPC 128, 150, 160.

A VPC is an on-demand configurable pool of shared computing resources allocated within the cloud environment 100A. VPCs are generally isolated from one another to ensure security of individual web services accounts for which the VPCs are instantiated. The isolation between VPCs (and the web services accounts associated with those VPCs) may be achieved through allocation of a private internet protocol (IP) subnet and a virtual communication construct (such as a virtual local area network (VLAN) and/or set of encrypted communication channels) per VPC (e.g., per web services account). In a VPC, the underlying mechanism that provides isolation (e.g., private IP subnet and/or virtual communication construct) may be accompanied with a virtual private network (VPN) function that secures remote access of an organization to resources in its VPCs using authentication and encryption mechanisms. The combination of these mechanisms within the cloud environment 100A results in a VPC, which is a portion of the cloud environment 100A that is not shared with others.

A separate account may also be generated for a directory service (labeled directory service account 105). The directory service account 105 may be an internal account that is transparent to customer accounts (e.g., to account A 125, account B 145 and account C 155). The directory service account 105 may include a VPC 112 that includes one or more instance of a directory service (e.g., an instance of Microsoft AD and/or AD Domain Services (AD DS)). In one embodiment, the directory service account 105 includes one or more domain controllers 118A, 118B, 118C. Each domain controller 118A-C may be a server computer that runs an instance of Microsoft AD and/or AD DS. A domain controller 118A-C responds to security authentication requests (e.g., logging in, checking permissions, etc.) within a domain (e.g., within a Windows domain), and authenticates and authorizes users and/or computers in the domain. A domain may include a number of resources that are accessible with the use of a single username and password combination (e.g., via single sign on (SSO)). The domain controllers 118A-C allow management and storage of information, provide authentication and authorization mechanisms, and establish a framework to deploy other services such as certificate services, federated services, lightweight directory services (e.g., lightweight directory access protocol (LDAP) services) and rights management services.

A directory service instance (e.g., a domain controller) may include a database and corresponding executable code responsible for servicing requests and maintaining the database. Directory structures may be arrangements of information about objects. The objects fall into two broad categories: resources (e.g., printers) and security principals (user or computer accounts and groups). Security principals may be assigned unique security identifiers (SIDs). Each object represents a single entity—whether a user, a computer, a printer, or a group—and its attributes. Certain objects can contain other objects. An object may be uniquely identified by its name and has a set of attributes—the characteristics and information that the object represents—defined by a schema, which also determines the kinds of objects that can be stored in the directory 142. The schema object lets administrators extend or modify the schema when necessary.

The framework within the directory 142 that holds the objects can be viewed at a number of levels. The forest, tree, and domain may be the logical divisions in a directory. Within a deployment, objects may be grouped into domains. The objects for a single domain may be stored in a single database (which can be replicated). Domains may be identified by their domain name system (DNS) name structure, the namespace. A domain may be a logical group of network objects (computers, users, devices) that share the same database. A tree may be a collection of one or more domains and domain trees in a contiguous namespace, and is linked in a transitive trust hierarchy. At the top of the structure may be the forest. A forest is a collection of trees that share a common global catalog, directory schema, logical structure, and directory configuration. The forest represents the security boundary within which users, computers, groups, and other objects are accessible. The directory 142 may include a single AD forest that may be made available in all VPCs (e.g., in VPCs 128, 150 and 160).

An administrator (e.g., a directory administrator who has administrative privileges to the directory 142 and can perform administrative tasks on the directory 142) may desire to set up a directory 142 (e.g., and an associated single AD forest) that may be shared across multiple different web services accounts (e.g., accounts 125, 145 and 155) and their associated VPCs 128, 150, 160. Embodiments enable such sharing of the directory 142 via one or more directory sharing components (not shown). Directory access may be shared with one or more additional web services accounts (e.g., account B 145 and account C 155), who are not owners of the directory but who are provided access to the directory 142. The directory sharing components may be distributed within the cloud environment 100A in multiple different configurations. For example, directory sharing components may be included in processing devices associated with one or more of the web services accounts 125-B, 145, 155, the directory service account 105 and/or VPCs 112, 128, 150, 160, for example.

To generate the directory 142, a VPC 112 may be generated for a directory service account 105 associated with the directory 142. The VPC 112 includes the one or more domain controllers 118A-C that will provide the directory 142. A VPC 112 may be generated from a template, which may be, for example, a JSON or YAML formatted template. The template may be used as blueprints for building the VPC 112 and one or more resources within the VPC 112. For example, a template can describe an Amazon Elastic Compute Cloud (EC2) instance or other web service instance that provides secure, resizable compute capacity in the cloud environment 110A, block storage (e.g., Amazon elastic block store (EBS) storage volumes for use with EC2 instances), network interfaces, domain controllers, applications (e.g., implementations of Samba to provide file and print services) and so on. In one embodiment, one or more of the different domain controllers 118A-C may be separated into distinct subnets.

In one embodiment, an auto scaling group (ASG) is generated within the VPC 112 for each domain controller 118A-C (or for one or more of the domain controllers). An ASG may contain a collection of EC2 instances or other on-demand compute instances that share similar characteristics and are treated as a logical grouping for purposes of instance scaling and management. For example, if a single application operates across multiple instances, it might be desirable to increase the number of instances in that group to improve the performance of the application, or decrease the number of instances to reduce costs when demand is low. The ASG can be used to scale the number of instances automatically based on specified criteria, or maintain a fixed number of instances even if an instance becomes unhealthy. Scaling policies can be used to increase or decrease the number of running compute instances (e.g., EC2 instances) in a group dynamically to meet changing conditions. When the scaling policy is in effect, the ASG adjusts the desired capacity of the group and launches or terminates instances as needed.

Additionally, a separate VPC 128 may be generated for the directory account (e.g., directory account A 125 of the directory administrator) from which the request to generate the directory 142 was initiated. One or more network interfaces (e.g., elastic network interfaces (ENIs) 130A, 130B, 130C are generated within the VPC 128. Each ENI 130A-C is a logical networking component in a VPC that represents a virtual network card. An ENI 130A-C may include a primary private IPv4 address from the IPv4 address range of VPC 128, one or more secondary private IPv4 addresses from the IPv4 address range of the VPC 128, One Elastic IP address (IPv4) per private IPv4 address, a public IPv4 address, one or more IPv6 addresses, one or more security groups, a media access control (MAC) address, a source/destination check flag, and/or a description. In one embodiment, a separate ENI 120A-C is generated for each domain controller 118A-C. For example, ENI 130A may be generated for communication with domain controller 118A, ENI 130B may be generated for communication with domain controller 118B, and so on.

An on-premises network 165 of an enterprise may be connected with account A 125 and/or with the associated VPC 128. Accordingly, applications from the on-premises network 165 may access the directory 142.

The directory service account 105 (and its VPC 112) and the web-services account 125 (and its VPC 128) together may define a data plane that may provide a directory service functionality (e.g., an Active Directory functionality) to the web services account A 125.

Traditionally, customers access the directory 142 (and underlying compute instances such as EC2 instances) via a single AWS account A 125 for which the directory 142 was generated. Network interfaces that are used to access the directory 142 and underlying compute instances are presented on the account A 125, but are not presented on other web services accounts (e.g., account B 145 or account C 155). Embodiments enable consumer accounts B 145 and C 155 to view and access the directory 142 using the same network interfaces (ENI 130A-C) that were generated for account A 125. In embodiments, a collection of application programming interfaces (APIs) are used that allow the owner of the directory 142 (account A 125) to share the directory 142 to any other web services account (e.g., account B 145, account C 155). These APIs may correspond to directory sharing components 690 of FIG. 6 in embodiments. The APIs may include APIs for a handshake model in which a directory consumer can request access to the directory 142 and/or a directory administrator can authorize access to the directory 142. Once the directory access has been accepted by the directory administrator, the directory consumer will be able to see the shared directory 142 on his directory service console page along with directory metadata such as DNS IP addresses, VPC settings, and so on.

To enable the sharing of the directory 142, once a determination has been made to share the directory 142, a connection may be made between a VPC of a directory consumer (e.g., consumer account B 145) and VPC 128 of the directory administrator (e.g., of directory account A 125) and/or between a VPC of the directory consumer and VPC 112 of the directory service account 105. In one embodiment, VPCs are connected by creating a tunnel between the VPCs. In one embodiment, VPC peering is implemented to generate the tunnel between the VPCs. VPC peering provides a direct path between VPCs.

In addition to connecting the VPCs, additional operations may be performed to enable discovery of the directory 142 across accounts (so that applications running in accounts of directory consumers can find the directory 142) and to bridge permission boundaries across accounts.

Additionally, to enable sharing of the directory 142, a virtual directory 172, 174 is generated. For example, virtual directory 172 may be generated for consumer account B 145 and virtual directory 174 may be generated for consumer account C 155. Web services account B 145 may map to virtual directory 172, which may map to directory 142. Similarly, web services account C 155 may map to virtual directory 174, which may map to directory 142. Each virtual directory 172, 174 includes a pointer to directory 142 and may include representations of one or more resources on the directory 142. The virtual directories may each have a distinct identifier (ID) that is different from an ID of the directory 142. Each virtual directory 172, 174 may be presented within an associated account 145, 155, and may provide a view of and access to the referenced directory 142. Access requests may be sent from an account (e.g., account B 145) to the directory 142 via the virtual directory 172. In one embodiment, each virtual directory 172, 174 is a symbolic link to the directory 142.

The use of virtual directories allows an enterprise to set up different accounts for different applications. For example, a user may log into account B 145 to manage Amazon WorkMail and may log into account C 155 to manage Amazon Workspaces. Amazon Workspaces is a managed, secure cloud desktop service. Customers can use Amazon WorkSpaces to provision either Windows or Linux desktops in just a few minutes and quickly scale to provide thousands of desktops to workers across the globe. Amazon WorkSpaces helps to eliminate the complexity in managing hardware inventory, OS versions and patches, and Virtual Desktop Infrastructure (VDI), which helps simplify a desktop delivery strategy. Amazon WorkMail is a secure, managed business email and calendar service with support for existing desktop and mobile email client applications. Amazon WorkMail gives users the ability to seamlessly access their email, contacts, and calendars using the client application of their choice, including Microsoft Outlook, native iOS and Android email applications, any client application supporting the IMAP protocol, or directly through a web browser. Amazon WorkMail and Amazon WorkSpaces can each access the same directory 142 in embodiments, which may control both the keys that encrypt data and the location in which data is stored.

Once a determination is made to share directory access to directory 142 between web services accounts, a record may be added to a data store 180, which may be used to store directory information. The data store 180 may be, for example, a database such as Amazon DynamoDB. The record may include, for example, the ID of the directory 142, the ID of the virtual directory 172, and the access permissions between the virtual directory 172 and the directory 142. Information regarding directory 142, virtual directories 172, 174, and the access permissions therebetween may be stored in tables in the data store 180. An example table schema for records of directory sharing is provided in FIG. 6. The directory 142 and/or virtual directories 172, 174 may be associated with aliases that enable these directories and virtual directories to be accessed via universal resource locators (URLs).

A directory administrator may restrict which applications are allowed to access the directory 142 from the various accounts. For example, account B 145 may include a first application 148 (or service) and account C 155 may include a second application 158 (or service). As shown, the first application 148 may run within VPC 150, while the second application 158 may be external to VPC 160. In an example, application 148 may be Amazon WorkSpaces and application 158 may be Amazon WorldDocs. Other example applications and services include Amazon relational database service (RDS), Amazon Quicksight, Amazon EC2, and so on. The directory administrator may set up the directory sharing such that account B 145 only has access to the directory 142 for application 148 (e.g., WorkSpaces). If a user attempts to use a different application (e.g., Workmail) within account B 145 to access the directory 142, such access would be denied. Application-level directory access information may also be stored in records in the data store. An example table schema for records indicating application permissions to shared directories is shown in FIG. 7.

Figure 1B:
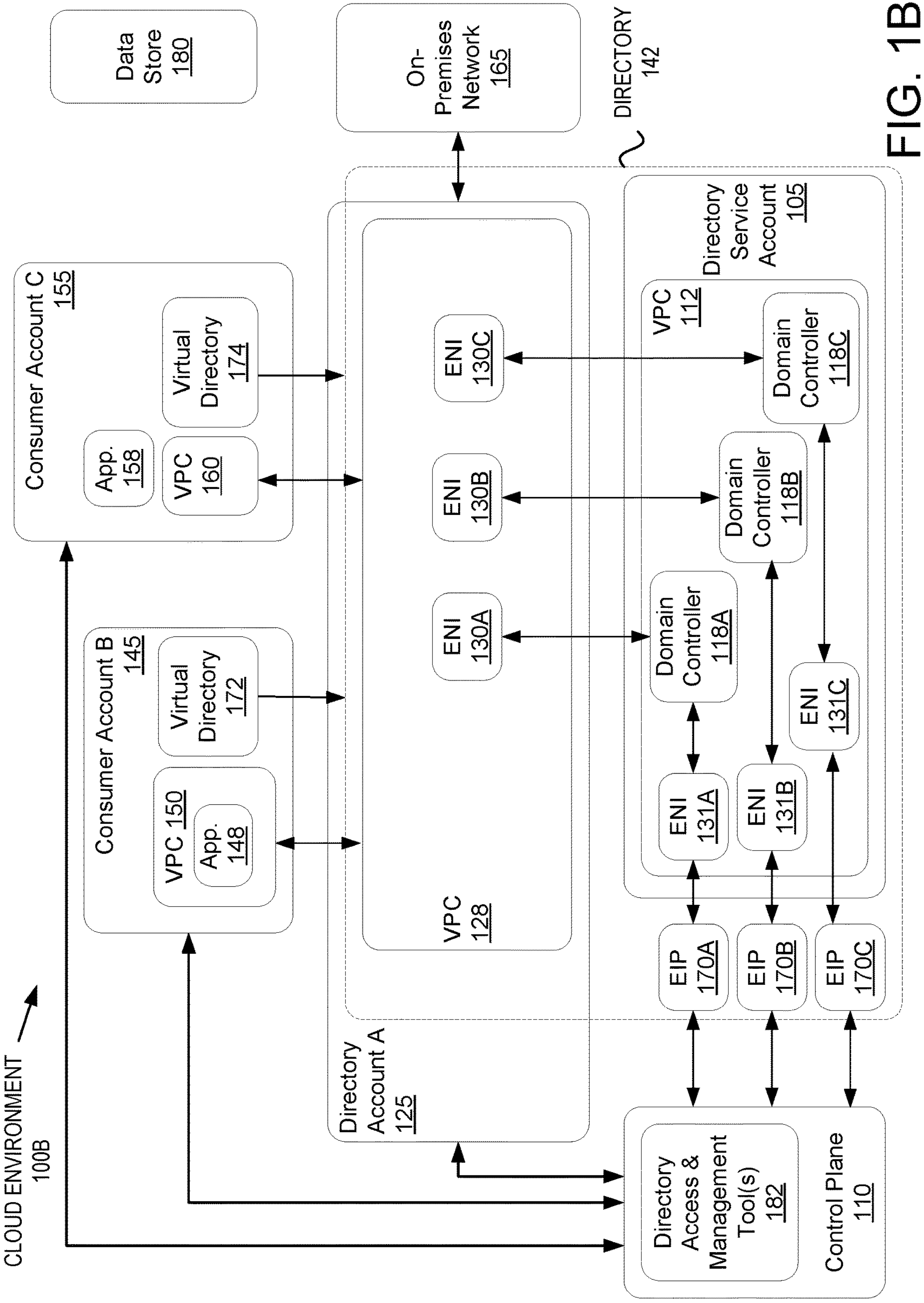
FIG. 1B illustrates another example cloud environment including a distributed architecture of connected VPCs that share a directory, according to embodiments of the present disclosure.

FIG. 1B illustrates another example cloud environment 100B including a distributed architecture of connected VPCs 112, 128, 150, 160 and/or web services accounts 125, 145, 155 that share a directory 142, according to embodiments of the present disclosure. The cloud environment 100B corresponds to cloud environment 100A, with the addition of a control plane 110. The control plane 110 in embodiments is responsible for administering, configuring and monitoring fault-tolerant directory service instances (e.g., AWS Managed Microsoft AD Service instances) on behalf of the directory administrator. The control plane 110 may include one or more directory access and management tools 182, which may include directory service instances and/or instances of other tools that may provide an intermediate layer that enables applications to communicate with the domain controllers 118A-C and access the directory 142.

The control plane 110 may connect to the domain controllers 118A-C in the VPC 112 via one or more elastic IP (EIP) addresses 170A, 170B, 170C, which may each be associated with (e.g., attached to) a different ENI (e.g., ENI 131A, ENI 131B, ENI 131C) in the VPC 112. Each ENI 131A-C and its connected EIP 170A-C may be associated with a particular domain controller 118A-C in embodiments. The EIPs 170A-C enable connections to be made to the domain controllers 118A-C through the control plane 110.

Some applications and/or services such as Amazon EC2 and Amazon RDS access the directory 142 through the network interfaces (e.g., ENI 30A-C) of VPC 128 on account A 125 for native operations on the directory 142. Other applications and/or services such as Amazon Quicksight, Amazon Chime, SSO, Amazon Connect, Amazon Workmail, Amazon WorkSpaces, Amazon WorldDocs, and so on access the directory 142 through the control plane 110. Such applications and services do not have a native AD workload, and so do not communicate directly with the domain controllers 118A-C through the ENIs 130A-C. Instead, such applications rely on an intermediate layer provided by the directory access and management tools 182 to communicate with the domain controllers 118A-C and access the directory 142. Some directory access and management tools 182 (e.g., AWS Directory Service) manage configuration, recovery, restoration, scale in operations, scale out operations, etc. of the directory 142 and/or domain controllers 118A-C. Other directory access and management tools 182 perform user group management operations such as creating users, creating groups, authenticating users, creating rules, adding users to groups, resetting passwords, and so on.

FIGS. 2-5 are flow diagrams showing various methods for sharing access to a directory (e.g., to a domain controller) between multiple different web services accounts and VPCs associated with those web services accounts, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. The processing logic may execute on one or many processing devices in a cloud environment. The various processing devices may reside within a single VPC or within multiple different VPCs. Where the processing logic is distributed across multiple processing devices, each of the processing devices may perform one or more of the operations for a method. The processing logic may correspond to one or more directory sharing components 690 of FIG. 6 in embodiments.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 2:
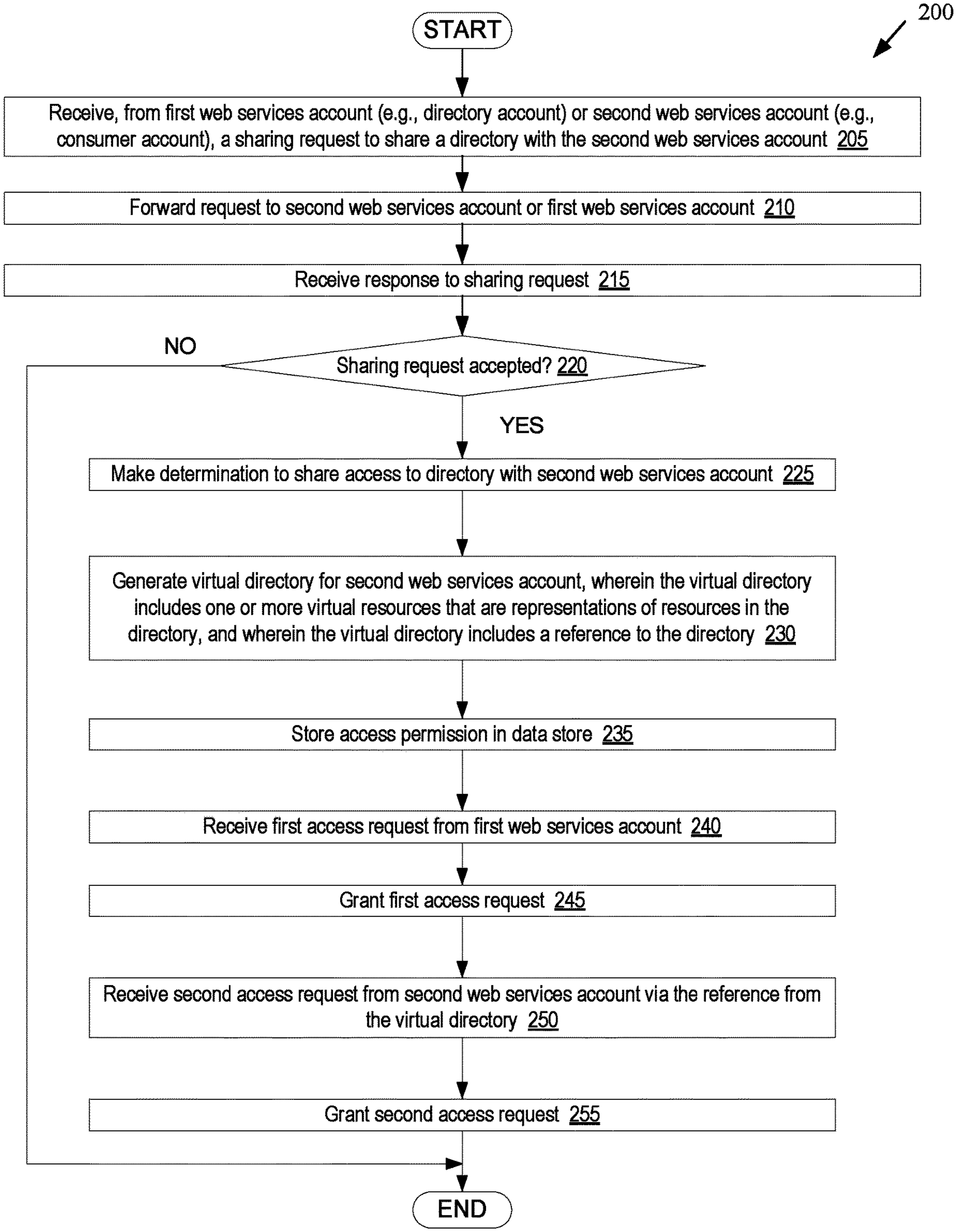
FIG. 2 depicts a flowchart illustrating one embodiment for a method of sharing a directory between web services accounts.

FIG. 2 depicts a flowchart illustrating one embodiment for a method 200 of sharing a directory between web services accounts. At block 205 of method 200, processing logic receives, from a first web services account with administrative privileges to the directory (e.g., such as directory account A 125) or a second web services account that lacks access to the directory (e.g., consumer account B 145 or consumer account C 155), a sharing request to share the directory with the second web services account. The request may be received via an API in a cloud environment. At block 210, processing logic may forward the request to the second web services account (if the request was received from the first web services account) or may forward the request to the first web services account (if the request was received from the second web services account). At block 215, processing logic receives a response to the sharing request (e.g., via the API or an additional API).

At block 215, processing logic determines whether the sharing request was accepted. If the sharing request was not accepted, then the method ends. If the sharing request was accepted, then the method continues to block 225. At block 225, processing logic then makes a determination to share the access to the directory with the second web services account. At block 230, processing logic generates a virtual directory for the second web services account. The virtual directory may include one or more virtual resources that are representations of resources in the directory. The virtual directory may additionally include a reference or pointer to the directory. The virtual directory may be visible to the second web services account, while the directory itself may not be visible to the second web services account since the directory is part of and/or associated with the first web services account. At block 235, processing logic stores an access permission for the second web services account to the directory in a data store. The access permission may include a unique ID of the directory, a unique ID of the virtual directory and/or a shared flag that indicates that the directory is shared with the virtual directory.

In some embodiments, the first web services account may be associated with a first region (e.g., a first geographic region) and the second web services account may be associated with a second region (e.g., a second geographic region). In such instances, processing logic may generate a cross-region mapping between the first region and the second region. This may include creating a local cross-region mapping for the first web services account and a same region mapping between the first web services account and the second web services account. For example, a customer A in a first region (e.g., IAD) may request for a directory D which belongs to a second region (e.g., PDX) in account B. Processing logic may initially create a mapping as A_IAD D-1→B_PDX D. When B accepts the request in PDX, processing logic may create a transitive dependency between A-IAD D-1 to B_IAD D-2 (where D-2 is a virtual directory) and B_IAD D-2 to B_PDX D. Processing logic may also generate two or more domain controllers for the customer B in the first region (e.g., IAD) in the VPC selected by B. This ensures that all runtime calls from applications will be local to a region.

At block 240, processing logic may receive a first access request from the first web services account. The first access request may be received through a VPC of the first web services account or from a control plane. At block 245, processing logic grants the first access request.

At block 250, processing logic may receive a second access request from the second web services account. The second access request may be received via the reference to the directory from the virtual directory. The second access request may then be received through the VPC of the first web services account or from the control plane. At block 255, processing logic grants the second access request.

Figure 3:
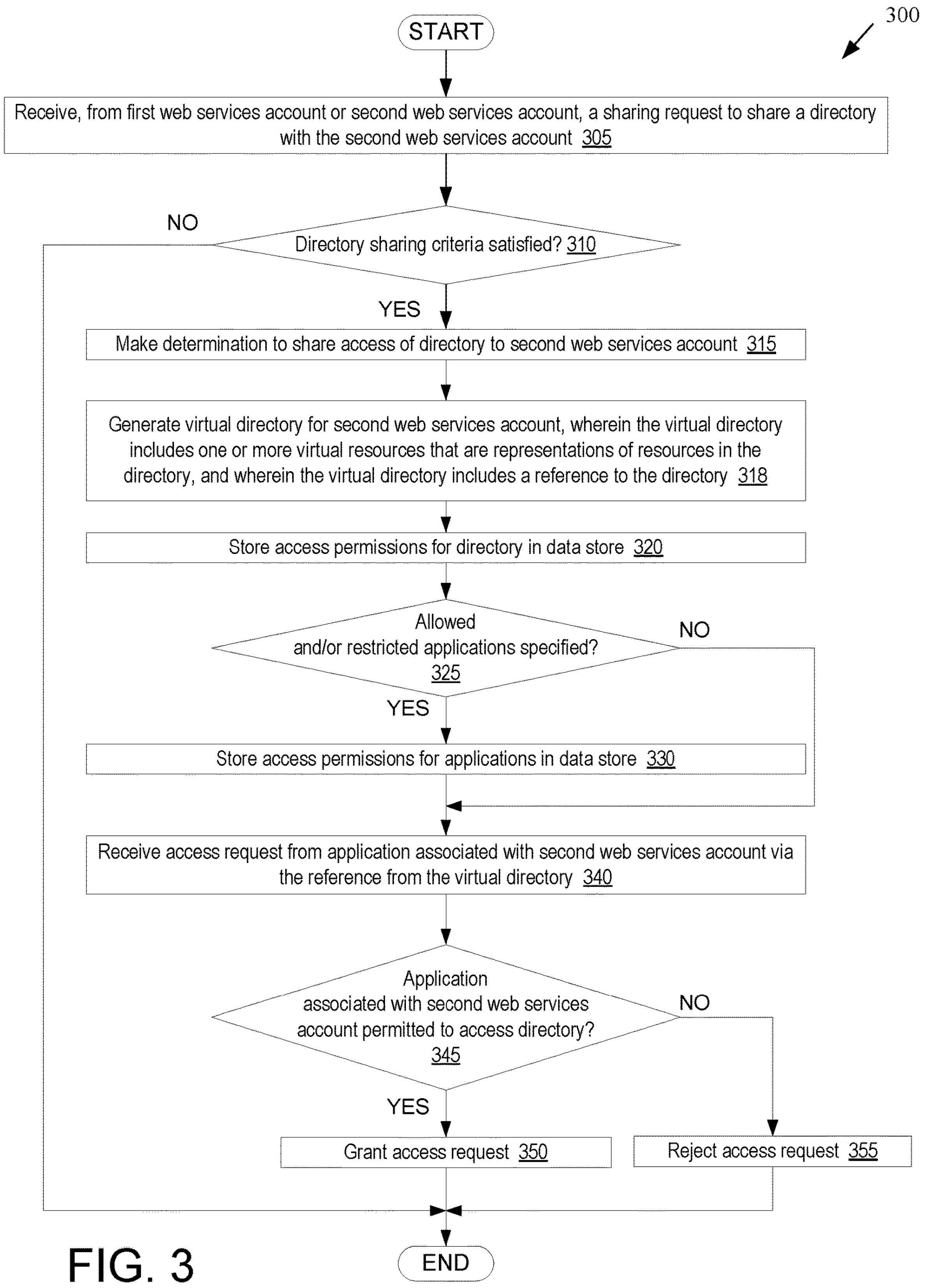
FIG. 3 depicts a flowchart illustrating one embodiment for a method of sharing a directory between web services accounts.

FIG. 3 depicts a flowchart illustrating one embodiment for a method 300 of sharing a directory between web services accounts. At block 305 of method 300, processing logic receives, from a first web services account with administrative privileges to the directory or a second web services account that lacks access to the directory, a sharing request to share the directory with the second web services account. At block 310, processing logic determines whether one or more directory sharing criteria are satisfied. A first directory sharing criterion may be a manual acceptance criterion, such as described in method 200 (e.g., in which a recipient of the request accepts or rejects the directory sharing request). A second directory sharing criterion may be a roles-based criterion. An identity and access management (IAM) service may assign various roles to web services accounts. Particular roles may be associated with directory sharing permissions. For example, a particular role may be associated with a rule that indicates a permission to access a directory. Accordingly, when a sharing request for access to a directory is received from a web services account that has the particular role, the sharing request may be granted automatically without user input. Alternatively, directory sharing may be performed automatically without receiving a request or acceptance of a sharing request. A third directory sharing criterion is an organizational criterion. In some embodiments, directory access may be shared with an entire organizational structure or branch of an organizational structure (e.g., as provided by AWS Organization). Processing logic may determine if the second web services account is included in an organization or branch of an organization with which access to the directory has been shared. If so, then processing logic may automatically accept the sharing request without user input, taking advantage of the implicit trust relationship established within the organization. Alternatively, directory sharing may be performed automatically without receiving a request or acceptance of a sharing request.

If the one or more directory sharing criteria are satisfied, the method proceeds to block 315. Otherwise the method ends. At block 315, processing logic then makes a determination to share the access to the directory with the second web services account. At block 318, processing logic generates a virtual directory for the second web services account. The virtual directory may include one or more virtual resources that are representations of resources in the directory. The virtual directory may additionally include a reference or pointer to the directory. The virtual directory may be visible to the second web services account, while the directory itself may not be visible to the second web services account since the directory is part of and/or associated with the first web services account. At block 320, processing logic stores access permissions (e.g., an access permission record) for the second web services account with respect to the directory in a data store.

At block 325, processing logic determines whether the any allowed and/or restricted applications are specified either in the sharing request, in a role associated with the second web services account, in an organization that includes the second web services account and/or in a response to the sharing request. If any application allowances and/or application restrictions are identified, the method continues to block 330. If no application allowances and/or restrictions are identified, the method proceeds to block 340. At block 330, processing logic stores access permissions for one or more applications associated with the second web services account with respect to the directory in the data store. The access permissions may include a whitelist of one or more applications that are permitted to access the directory from the second web services account and/or a blacklist of one or more applications that are not permitted to access the directory from the second web services account. If a whitelist is used, those applications not listed are blocked from accessing the directory from the second web services account. If a blacklist is used, those applications not listed are permitted to access the directory from the second web services account. In one embodiment, the operations of blocks 320 and 330 are combined into a single operation.

In some embodiments, second web services account may be associated with one or more directory-level roles and/or one or more application-level roles. Directory-level roles may be roles that have access to a directory. Application level roles may be roles that specify specific applications that have access to a directory.

At block 340, processing logic may receive an access request from an application associated with (e.g., running on a VPC of) the second web services account. The access request may be received via the reference to the directory from the virtual directory. The access request may then be received through the VPC of the first web services account or from the control plane.

At block 345, processing logic determines whether the application that generated the access request is permitted to access the directory from the second web services account. If so, the method continues to block 350, at which processing logic grants the second access request. If not, the method proceeds to block 355, at which processing logic rejects the request. The method then ends.

Figure 4:
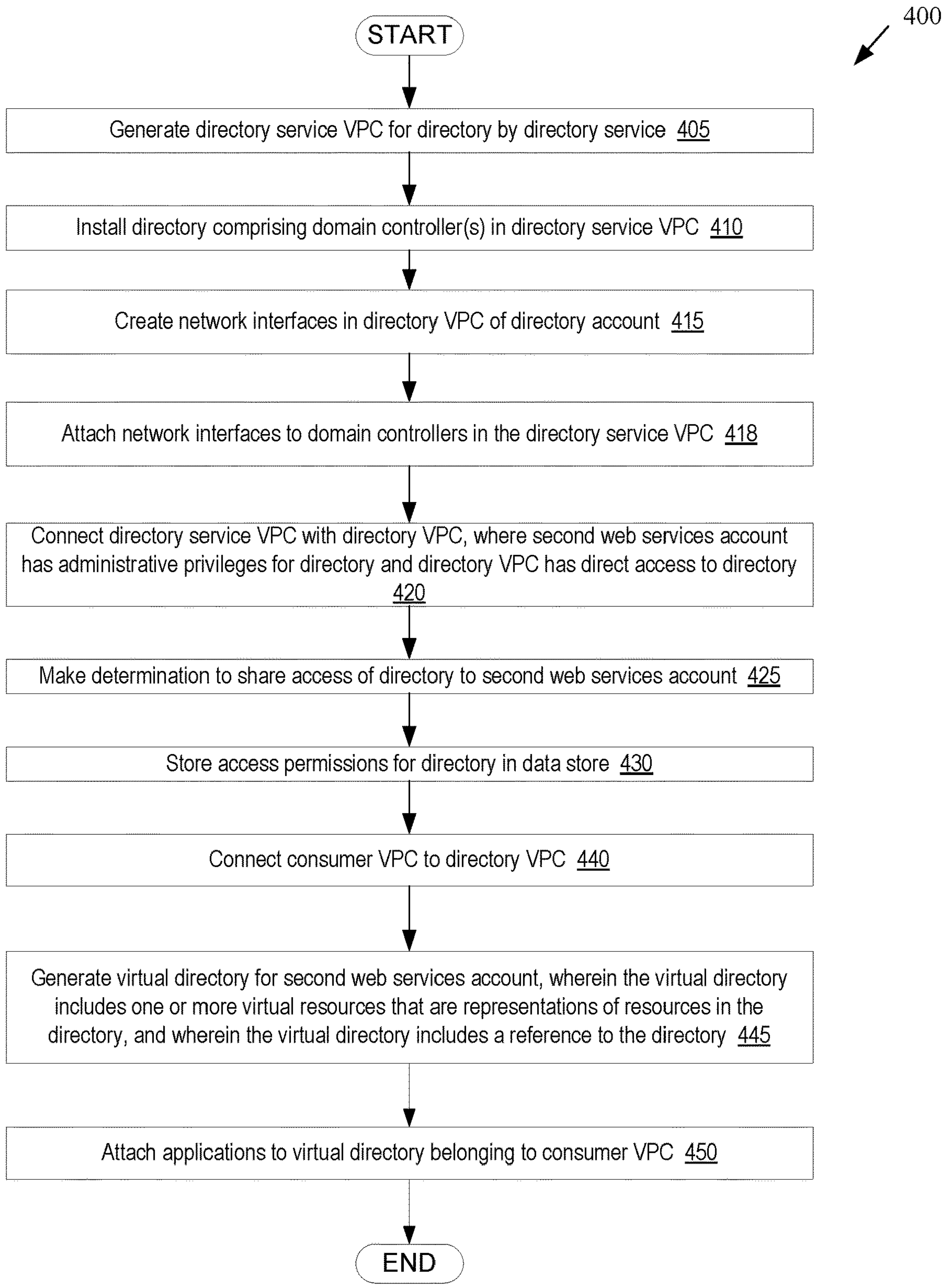
FIG. 4 depicts a flowchart illustrating one embodiment for a method of connecting VPCs associated with different web services accounts.

FIG. 4 depicts a flowchart illustrating one embodiment for a method 400 of connecting VPCs associated with different web services accounts and sharing directory access between the different web services accounts. At block 405 of method 400, processing logic generates a first VPC for a directory (e.g., a directory service VPC for a domain controller that provides the directory). At block 410, processing logic installs one or more directory controllers in the first VPC (the directory service VPC). At block 415, processing logic creates one or more network interfaces (e.g., ENIs 130A-C) in a second VPC (e.g., in a directory VPC) of a directory account. At block 418, processing logic attaches the one or more network interfaces (e.g., ENIs 130A-C) to the domain controller(s) in the first VPC. At block 420, processing logic connects the second VPC to the first VPC. The second web services account may have administrative privileges for the directory and the second VPC may have access to the directory via one or more ENIs in the second VPC and/or in the first VPC.

At block 425, processing logic makes a determination to share access of the directory to a second web services account. At block 430, processing logic stores access permissions for the directory in a data store.

At block 440, processing logic connects a third VPC (e.g., a consumer VPC) for the second web services account to the second VPC. In one embodiment, the third VPC is connected to the second VPC (and/or the first VPC) via VPC peering, as described above. The third VPC may include one or more applications in embodiments. Additionally, or alternatively, the second web services account may include one or more applications that are external to the third VPC.

At block 445, processing logic generates a virtual directory for the second web services account. At block 450, processing logic may then attach one or more applications in the second web services account (and possibly in the third VPC) to the virtual directory belonging to the third VPC/second web services account. The third web services account may be mapped to the virtual directory, and the virtual directory may be mapped to the directory.

Figure 5:
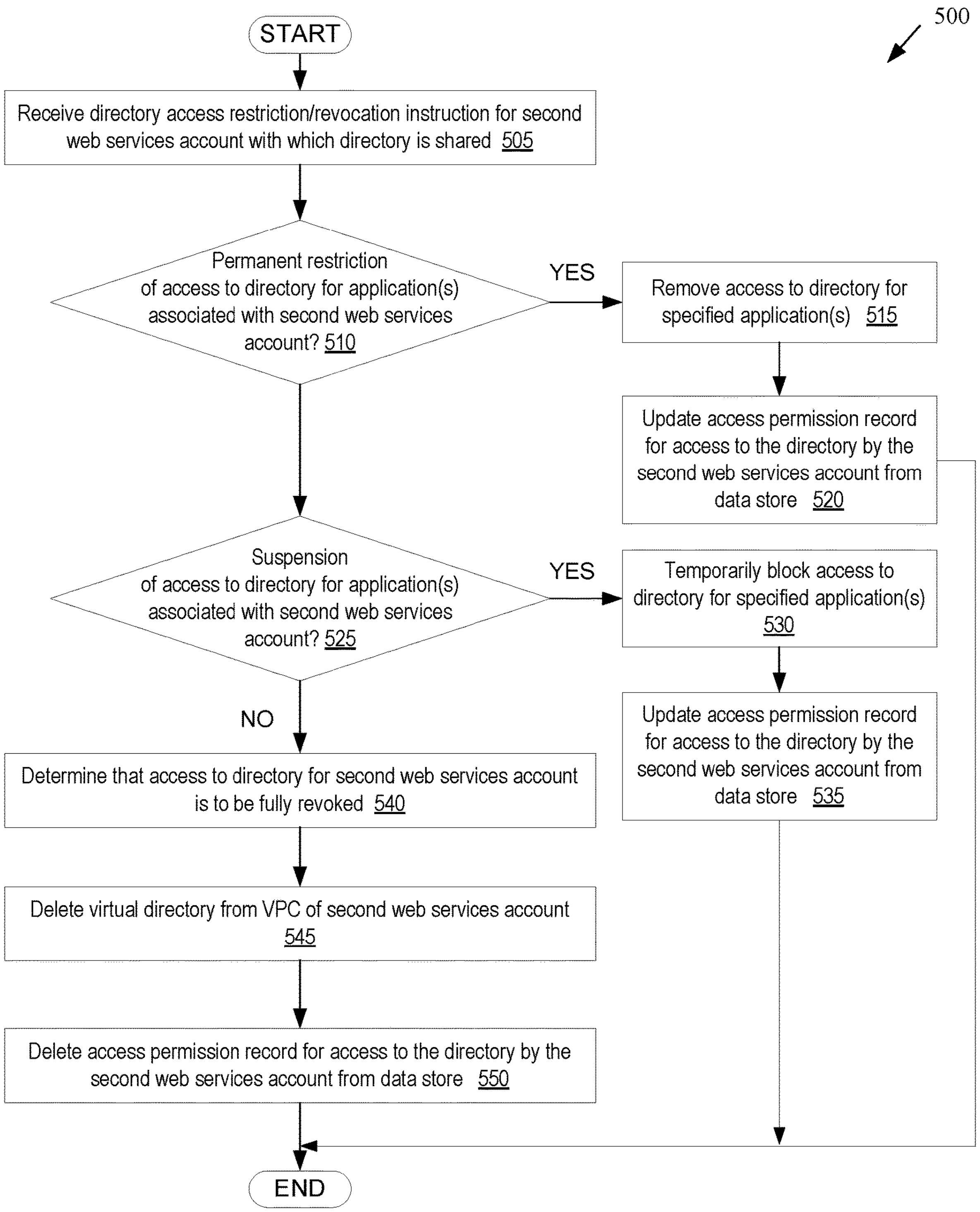
FIG. 5 depicts a flowchart illustrating one embodiment for a method of restricting or removing directory access for a web services account.

FIG. 5 depicts a flowchart illustrating one embodiment for a method 500 of restricting or removing directory access for a web services account. At any time after directory access is granted to a web services account and/or to an application running on a web services account and/or associated with a web services account, such directory access may be restricted or revoked. At block 505, processing logic receives an access restriction and/or revocation instructions for the second web services account with which a directory is shared. At block 510, processing logic determines whether the instruction is for permanent restriction of access to the directory for one or more applications associated with the second web services account. If so, the method continues to block 515. In either case, the method also proceeds to block 525.

At block 515, processing logic removes access to the directory for the specified application or applications. At block 520, processing logic then updates an access permission record for access to the directory by the second web services account. The access permission record may be stored in a data store.

At block 525, processing logic determines whether the instruction specified that access to the directory for one or more applications associated with the second web services account are to be suspended. If so, the method continues to block 530. Otherwise, the method continues to block 540.

At block 530, processing logic temporarily blocks access to the directory for the specified applications. At block 535, processing logic updates an access permission record for access to the directory by the second web services account.

At block 540, processing logic determines that access to the directory for the second web services account is to be fully revoked. At block 545, processing logic deletes a virtual directory associated with the second web services account from a VPC of the second web services account. At block 550, processing logic deletes an access permission record for access to the directory by the second web services account from the data store. The method then ends.

FIG. 6 illustrates an example table schema for records indicating sharing of directory access between web services accounts. In the example table schema, the attribute ConsumerAccountId_AirportCode includes an account ID for a web services account with which a directory is shared as well as an airport code for a region from which a directory sharing request was sent. The airport code may be useful during cross-region authorization. This attribute may be a hash key and has the type string. ConnectionId may be a range key for the relationship between web services accounts (e.g., between a directory administrator and a directory consumer). OwnerAccountId_AirportCodemay be a string that includes the account ID for the web services account that controls the directory (e.g., for the directory administrator) as well as the airport code of the region where the request was sent to. The OwnerAccountID may be a string that includes the web services account ID for the web services account that controls the directory. OwnerExternalDomainID may be a string that represents an external domain ID of the web services account that controls the domain. ConsumerAccountID may be a string that includes the web services account ID for the web services account that requested access to the directory. ConsumerExternalDomainID may be a string that represents an external domain ID of the web services account that requested access to the domain. Status is a string that represents a status of a connection between the consumer account and the owner account (e.g., between the two web services accounts). CreationDate is a string that indicates a date that a directory sharing record was created. LastUpdateDate is a string that indicates a date on which the record was last updated. The payload is a string for storing requestor and other information related to the relationship in the future.

FIG. 7 illustrates a sample table schema for records indicating application permissions to shared directories. CustomerId indicates the customer ID for which permissions are being stored (e.g., for the web services account for which permissions are being stored). ExternalDomainID is a string that indicates an external domain ID for which permissions are being stored. ConnectionID is a string that indicates a relationship ID. CreationDate is a string that indicates a date that a directory sharing record was created. LastUpdateDate is a string that indicates a date on which the record was last updated. The payload is a string for storing a permission list (e.g., a whitelist or blacklist of applications that are permitted or not permitted access to a directory).

Figure 8:
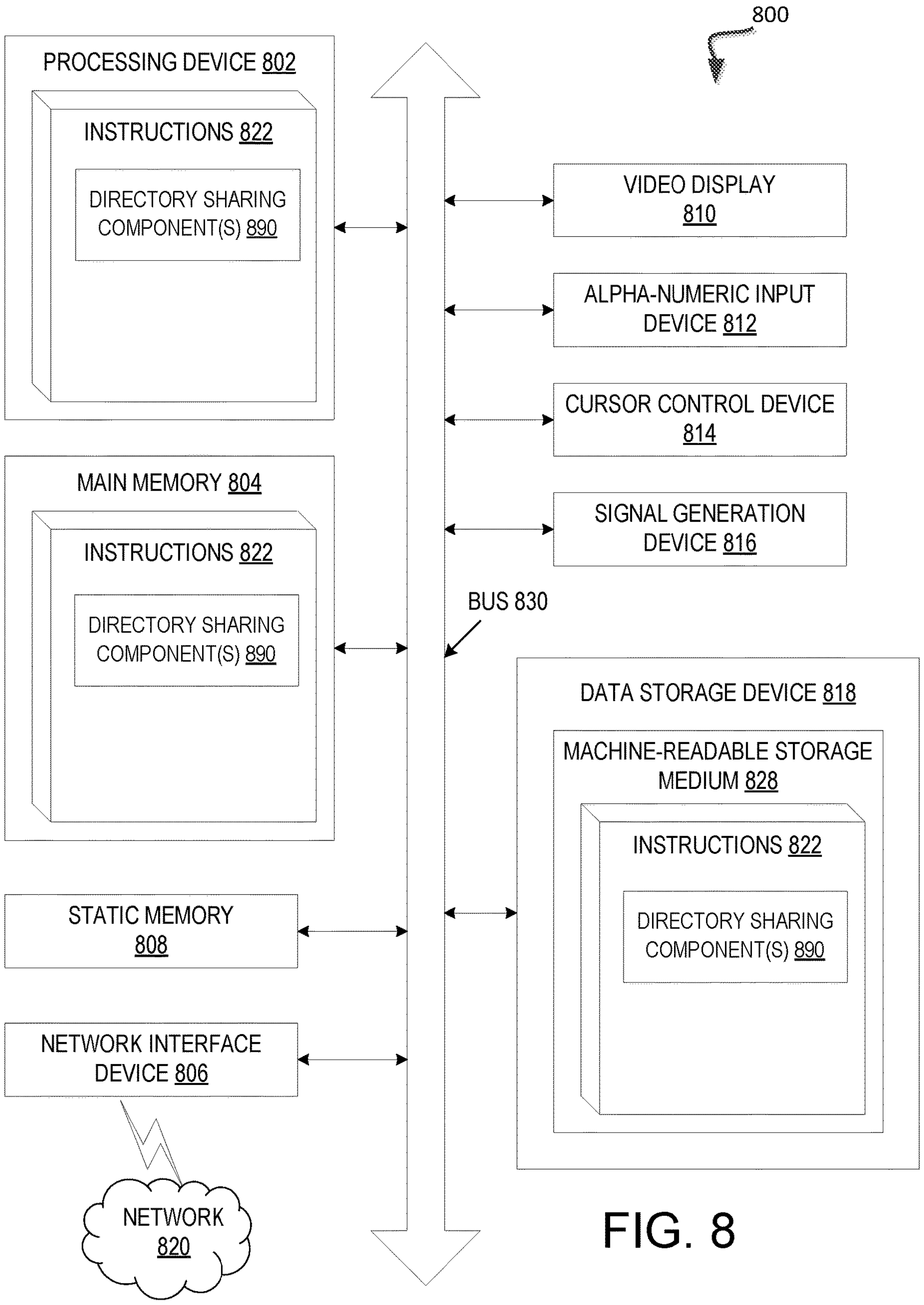
FIG. 8 is a schematic block diagram that provides one example illustration of a computing device executing one or more components of a software verification service, according to one embodiment of the present disclosure.

FIG. 8 illustrates a diagrammatic representation of a machine in the exemplary form of a computer system (computing device) 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. The system may be a single compute node in an on-demand configurable pool of shared computing resources in some embodiments. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, compute node, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (e.g., a processor) 802, a main memory device 804 (e.g., read-only memory (ROM), flash memory, dynamic random access memory (DRAM) such as synchronous DRAM (SDRAM)), a static memory device 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions for one or more directory sharing components 890 (e.g., APIs) for performing the operations discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions of directory sharing components 890 embodying any one or more of the methodologies or functions described herein. The instructions may also reside, completely or at least partially, within the main memory 804 and/or within processing logic of the processing device 802 during execution thereof by the computer system 800, the main memory 804 and the processing device 802 also constituting computer-readable media.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "receiving", "making", "storing", "generating", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. One or more non-transitory computer readable media comprising instructions that, when executed by one or more processing devices, cause the one or more processing devices to perform operations comprising:

receiving a sharing request to share access of a directory with a second web services account that lacks access to the directory, wherein a first web services account has administrative privileges to the directory, and wherein the sharing request is received from a first one of the first web services account and the second web services account;

receiving an acceptance of the sharing request from a second one of the first web services account and the second web services account;

making a determination to share access of the directory to the second web services account including determining that the second web services account and the first web services account share and organizational group;

determining that the organizational group comprises a service control policy that permits sharing of the directory, wherein the directory is managed by a domain controller that runs within a first virtual private cloud (VPC) and the second web services account is associated with a second VPC;

storing an access permission record for the access to the directory by the second web services account in a data store;

generating a virtual directory for the second web services account, wherein the virtual directory permits the second web services account access to the directory from the first web services account, wherein the virtual directory comprises one or more virtual resources that are representations of resources on the directory, and wherein the virtual directory further comprises a reference to the directory;

receiving an access request to the directory from the second web services account, wherein the access request is received via the reference from the virtual directory to the directory; and automatically grant access to the directory for the second web services account.

2. The one or more non-transitory computer readable media of claim 1, the operations further comprising:

receiving an indication of one or more applications associated with the second web services account that are to have access to the directory;

granting to the one or more applications associated with the second web services account access to the directory; and storing an additional access permission record for the access of the one or more applications associated with the second web services account to the directory in the data store.

3. The one or more non-transitory computer readable media of claim 2, the operations further comprising:

receiving an instruction to restrict access of the one or more applications to the directory for the second web services account; and blocking access of the one or more applications to the directory for the second web services account.

4. A computer-implemented method comprising:

receiving a sharing request to share a directory with a second web services account;

making a determination to share access to the directory between a first web services account that has administrative privileges to the directory and the second web services account that lacks access to the directory including determining that the second web services account and the first web services account share an organizational group;

determining that the organizational group comprises a service control policy that permits sharing of the directory, wherein the directory is managed by a directory service that executes within a first on-demand configurable pool of shared computing resources, and wherein the second web services account is associated with a second on-demand configurable pool of shared computing resources;

generating a virtual directory for the second web services account, wherein the virtual directory permits the second web services account access to the directory from the first web services account, wherein the virtual directory comprises one or more virtual resources that are representations of resources on the directory, and wherein the virtual directory further comprises a reference to the directory;

receiving an access request to the directory from the second web services account, wherein the access request is received via the reference from the virtual directory to the directory; and automatically granting access to the directory for the second web services account.

5. The computer-implemented method of claim 4, further comprising:

storing an access permission record for the access to the directory by the second web services account in a data store.

6. The computer-implemented method of claim 5, further comprising:

receiving an instruction to remove access to the directory for the second web services account; and removing the access permission record for the access to the directory by the second web services account from the data store, wherein the second web services account loses access to the directory but the first web services account maintains access to the directory and the directory.

7. The computer-implemented method of claim 4, further comprising:

receiving an indication of one or more applications associated with the second web services account that are to have access to the directory;

granting to the one or more applications associated with the second web services account access to the directory; and storing an access permission record for the access of the one or more applications associated with the second web services account to the directory in a data store.

8. The computer-implemented method of claim 7, further comprising:

receiving an instruction to suspend access of the one or more applications to the directory for the second web services account; and temporarily blocking access of the one or more applications to the directory for the second web services account.

9. The computer-implemented method of claim 4, further comprising:

generating an application-level role comprising an indication of one or more applications that have access to the directory;

assigning the application-level role to the second web services account;

receiving a sharing request to share access to the directory with the second web services account;

determining that the second web services account has the application-level role; and automatically granting access to the directory for the one or more applications associated with the second web services account.

10. The computer-implemented method of claim 4, further comprising:

generating a directory-level role that has access to the directory;

assigning the directory-level role to the second web services account;

receiving a sharing request to share access to the directory with the second web services account;

determining that the second web services account has the directory-level role; and automatically granting access to the directory for the second web services account.

11. The computer-implemented method of claim 4, wherein the first on-demand configurable pool of shared computing resources is a first virtual private cloud (VPC) and the second on-demand configurable pool of shared computing resources is a second VPC, the method further comprising:

generating the first VPC comprising the directory and an instance of the directory service that manages the directory;

creating one or more network interfaces in a third VPC associated with the first web services account;

attaching the one or more network interfaces to the directory service in the first VPC;

connecting the third VPC to the first VPC; and connecting the second VPC to the third VPC, wherein the second VPC has indirect access to the directory via the virtual directory.

12. The computer-implemented method of claim 11, further comprising:

generating a tunnel between the second VPC and the third VPC.

13. The computer-implemented method of claim 4, further comprising:

receiving a sharing request to share the directory with the second web service account from a first one of the first web services account and the second web services account; and receiving an acceptance of the sharing request from a second one of the first web services account and the second web services account.

14. The computer-implemented method of claim 4, wherein the first web services account is associated with a first region and the second web services account is associated with a second region, the method further comprising:

generating a cross-region mapping between the first region and the second region.

15. A system comprising:

a first on-demand configurable pool of shared computing resources that act together to provide a directory that is managed by a directory service;

a second on-demand configurable pool of shared resources associated with a first web services account that has administrative privileges to the directory;

a third on-demand configurable pool of shared resources associated with a second web services account; and one or more processing devices from at least one of the first on-demand configurable pool of shared computing resources, the second on-demand configurable pool of shared resources or the third on-demand configurable pool of shared resources that operate together to perform the following comprising:

receive a sharing request to share the directory with the second web services account, wherein the sharing request is received from a first one of the first web services account and the second web services account;

make a determination to share access to the directory with the second web services account including determine that that the second web services account and the first web services account share an organizational group;

determine that the organizational group comprises a service control policy that permits sharing of the directory;

generate a virtual directory for the second web services account, wherein the virtual directory permits the second web services account access to the directory from the first web services account, wherein the virtual directory comprises one or more virtual resources that are representations of resources on the directory, and wherein the virtual directory further comprises a reference to the directory; and automatically grant access to the directory for the second web services account.

16. The system of claim 15, wherein the one or more processing devices are further to:

store an access permission record for the access to the directory by the second web services account in a data store;

receive an indication of one or more applications associated with the second web services account that are not to be provided access to the directory;

store an additional access permission record to indicate a blocked access of the one or more applications to the directory for the second web services account in the data store; and block the one or more applications associated with the second web services account from access to the directory.

17. The system of claim 15, wherein the one or more processing devices are further to:

receive an access request to the directory from the second web services account, wherein the access request is received via the reference from the virtual directory to the directory; and grant the access request.

18. The system of claim 15, wherein the one or more processing devices are further to:

generate a directory-level role that has access to the directory;

assign the directory-level role to the second web services account;

determine that the second web services account has the directory-level role; and automatically grant access to the directory for the second web services account based on the directory-level role assigned to the second web services account.

* * * * *